(12) United States Patent
Donkervoet et al.

(10) Patent No.: US 11,527,877 B2
(45) Date of Patent: Dec. 13, 2022

(54) ELECTRICAL ELEMENT PASS THROUGH PLATE CONSTRUCTIONS

(71) Applicant: TE Connectivity Corporation, Berwyn, PA (US)

(72) Inventors: Oliver Donkervoet, Lewisville, NC (US); David Allen Klein, Kernersville, NC (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 0 days.

(21) Appl. No.: 16/694,960

(22) Filed: Nov. 25, 2019

(65) Prior Publication Data

US 2021/0159683 A1 May 27, 2021

(51) Int. Cl.
*H02G 3/22* (2006.01)
*B60R 16/02* (2006.01)

(52) U.S. Cl.
CPC ........... *H02G 3/22* (2013.01); *B60R 16/0215* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,372,441 A * | 3/1968 | Fisher | ...................... | B62D 1/16 16/2.1 |
| 4,656,689 A * | 4/1987 | Dennis | ..................... | F16L 5/027 16/2.2 |
| 4,688,747 A * | 8/1987 | Helmsdorfer | ............ | H02G 3/22 174/67 |
| 5,762,612 A * | 6/1998 | Campbell | ............... | G06F 3/011 600/558 |
| 5,961,345 A * | 10/1999 | Finn | ..................... | H01R 13/518 439/536 |
| 6,393,658 B1 * | 5/2002 | Chong | ................... | A47B 21/06 16/2.2 |
| 7,183,487 B1 * | 2/2007 | O'Young | ................. | H02G 3/14 174/66 |
| D611,170 S * | 3/2010 | Hiner | ...................... | H02G 3/14 D25/138 |
| 8,324,516 B1 * | 12/2012 | Gretz | ..................... | H02G 3/083 174/659 |

(Continued)

FOREIGN PATENT DOCUMENTS

EP 1744425 A1 * 1/2007 ............. H02G 3/085

*Primary Examiner* — Paresh Paghadal

(57) ABSTRACT

Pass through plates comprise a body with an opening between opposed first and second surfaces for accommodating the passage of electrical elements. One or more upper retaining elements project outwardly from the body and are positioned adjacent a body top portion. One or more lower retaining elements project from the body and are positioned adjacent a body bottom portion. The upper and lower retaining elements are each configured to both engage respective top and bottom sections of an opening in an external object, and to engage a backside surface of the external object when installed within the opening to retain the pass through plate for attachment with the external object. The upper and lower retaining elements are positioned to enable movement of the pass through plate from an upward position in the opening to a downward position in the opening for fixed attachment with the external object.

20 Claims, 6 Drawing Sheets

(56) References Cited

U.S. PATENT DOCUMENTS

| | | | |
|---|---|---|---|
| 8,357,853 B1* | 1/2013 | Gretz | H02G 3/14 |
| | | | 174/67 |
| 8,592,681 B2* | 11/2013 | Alderson | H01H 13/86 |
| | | | 174/67 |
| 2006/0180332 A1* | 8/2006 | Dinh | H02G 3/185 |
| | | | 174/66 |
| 2008/0035364 A1* | 2/2008 | O'Young | H02G 3/14 |
| | | | 174/66 |
| 2011/0001408 A1* | 1/2011 | Caveney | G02B 6/4471 |
| | | | 312/296 |
| 2011/0083873 A1* | 4/2011 | Hartman | H04Q 1/06 |
| | | | 174/66 |
| 2011/0290625 A1* | 12/2011 | Castaldo | H01H 21/04 |
| | | | 200/297 |
| 2011/0308832 A1* | 12/2011 | Merritt | H02G 3/083 |
| | | | 174/50 |
| 2012/0062086 A1* | 3/2012 | Garza, Jr. | H05K 5/0213 |
| | | | 312/236 |
| 2013/0292157 A1* | 11/2013 | Sprenger | H02G 3/083 |
| | | | 174/151 |
| 2017/0291014 A1* | 10/2017 | Royer | A61M 25/0026 |

* cited by examiner

ELECTRICAL ELEMENT PASS THROUGH PLATE CONSTRUCTIONS

FIELD

Pass through plate constructions as disclosed herein relate to plates used for passing electrical elements between different compartments or portions of a vehicle and, more specifically, pass through plate constructions that are specially configured to accommodate installation and attachment of the pass through plate with an opening in an external object such as a panel or plate positioned between such compartments or portions of a vehicle.

BACKGROUND

Pass through plates are known for example as used in vehicles such as trucks and the like for enabling the passage of electrical elements, cables, or conductors between the passenger cabin and the engine compartment of the vehicle. For this reason, such pass through plates may be referred to as cabin pass through (CPT) plates or the like. In an example, such pass through plates may be disposed in the cabin and are attached to a pedal plate or panel located inside of the cabin near the operating pedals for the vehicle. Such pass through plates are formed from an electrically nonconductive material and include openings therethrough to accommodate placement of the electrical elements, cables, or conductors running between the vehicle engine compartment and cabin.

Conventional pass through plates typically include a body having the openings noted above for accommodating the placement of the electrical elements therethrough, and the body is adapted to be fixedly mounted to a portion of the vehicle cabin (i.e., the pedal plate or panel) once the plate containing the electrical elements are installed into the vehicle. In some instances, the electrical elements are provided in the form of a wiring harness that is combined with the pass through plate before the pass through plate is installed into the vehicle. In such instances, a technician installing the pass through plate must make a special effort and take extra time needed to position and align the pass through plate with the pedal plate or panel opening so that mounting or attachment holes in the pass through plate align with mounting or attachment holes around the pedal plate or panel opening. During this installation process, the technician must then hold the pass through plate in an aligned position with the pedal plate or panel opening, e.g., by using one or more fasteners extending through holes around the pedal plate or panel opening and into the attachment holes in the pass through plate.

The installation process associated with such conventional pass through plates is somewhat awkward and difficult because the pass through plate includes the weight and stored stress of the wiring harness caused by the wiring harness being in an already-connected state when positioned within the pass through plate. Thus, any tension created on the wires in the harness is supported by the pass through plate and the technician must maintain the position and alignment of the pass through plate attachment holes while installing the fasteners. Also, this mounting process is typically done by only one technician working from one side of the pedal plate or panel opening, which further contributes to the installation process being awkward and time consuming.

It is, therefore, desired that pass through plates be constructed in a manner that facilitates installation of the pass through plate with the vehicle in a manner that reduces or eliminates the awkward and time consuming process associated with installing conventional pass through plates, thereby expediting and increasing the efficiency of installation by a single technician.

SUMMARY

Pass through plates as disclosed herein are configured for accommodating the passage of one or more electrical elements therethrough and are attached adjacent an opening through an external object such as a pedal plate or panel when used in a vehicle application. In an example, the pass through plate comprises a body comprising opposed first and second surfaces. The body includes a number of mounting or attachment holes positioned along a peripherical edge of the body along the first surface for attaching the body to the external object. The body includes one or more openings disposed through the body and extending between opposed peripheral edges of the body for accommodating the passage of one or more electrical elements therethrough. In an example, the body may be rectangular in shape.

The body includes one or more first or upper retaining elements that project outwardly a distance from the body first surface and that are positioned adjacent a top portion of the body peripheral edge. In an example, the body includes a pair of the first retaining elements. In an example, the one or more first retaining elements include a first section that extends outwardly in a perpendicular direction away from the body first surface, and a second section that extends in an upward direction relative to the first section. The body includes one or more second or lower retaining elements that project outwardly a distance from the first surface and that are positioned adjacent a bottom portion of the body peripheral edge. In an example, the body includes a pair of the second retaining elements. In an example, the one or more second retaining elements include a first section that extends outwardly in a perpendicular direction away from the body first surface, and a second section that extends in a downward direction relative to the first section. In an example, the first and second retaining elements are integral with the body and form a one-piece construction. In an example, the one or more first retaining elements are configured to retain the top portion of the pass through plate within a top section of an opening in an external object while the one or more second retaining elements are configured to retain the bottom portion of the pass through plate within a section of the opening in the external object.

In an example, first sections of the first and second retaining elements are spaced longitudinally apart from one another on the body to enable movement of the pass through plate relative to the external object opening during installation of the plate when the first and second retaining elements are disposed in respective top and bottom sections of the external object opening. In an example, the first and second retaining elements are positioned longitudinally along the body so that when disposed within the opening in an external object the holes disposed along the peripheral edge of the body align with attachment holes in the external object. In an example, the first sections of each of the first retaining element and the second retaining element have a length that is greater than a thickness of the external object opening. In an example, the first and second retaining elements second sections include ends, and the distance between opposed ends of the first and second retaining elements is greater than a distance between opposed top and bottom surfaces of the external object opening that are in contact with the first and second retaining elements when the pass through plate is installed therein.

Pass through plates as disclosed here may be used to retain placement against the external object comprising the opening by engaging the top portion of the pass through plate first surface within a top section of the external object opening such that the first retaining element engages and is disposed within the opening top section. The remaining portion of the pass through plate body that extends downwardly from the top portion is moved by pivoting action towards a bottom section of the opening in the external object while the first retaining element remains disposed in the opening top section. During the process of pivoting the pass through plate body, the engagement of the first retaining element with the opening top section operates to align the pass through plate relative to the opening to facilitate placement of the second retaining element into the bottom section of the opening so that the pass through plate body first surface is positioned adjacent the external object. During the process of pivoting the pass through plate body so that the second retaining elements are disposed within the bottom section of the opening the pass through plate body is supported upwardly. The pass through plate body is then lowered by removing the upward support causing the pass through plate body to move downwardly within the opening such that the first and second retaining element second sections engage a backside surface of the external element to retain the pass through plate within the opening such that the mounting or attachment holes of the pass through plate are aligned with attachment holes in the external object. The pass through plate is fixedly attached to the external object through the use of threaded fastening elements that engage the attachment holes of the pass through plate body.

Configured in this manner, pass through plates enable installation in a manner that is self-aligning to thereby eliminate the awkwardness associated with having to both support and retain the position of the pass through plate relative to external object opening during the entire installation process. Further, pass through plates as disclosed herein comprising the retaining elements configured in the manner described enables installation by a single technician and further uses the weight of the pass through plate and the electrical elements, e.g., wiring harness, disposed therethrough to enable and facilitate attachment and retention within the opening, thereby increasing installation efficiency.

BRIEF DESCRIPTION OF THE DRAWINGS

Pass through plate constructions as disclosed herein will now be described by way of example with reference to the accompanying figures, wherein like reference numerals refer to like elements, and of which.

DETAILED DESCRIPTION

Figure 1:
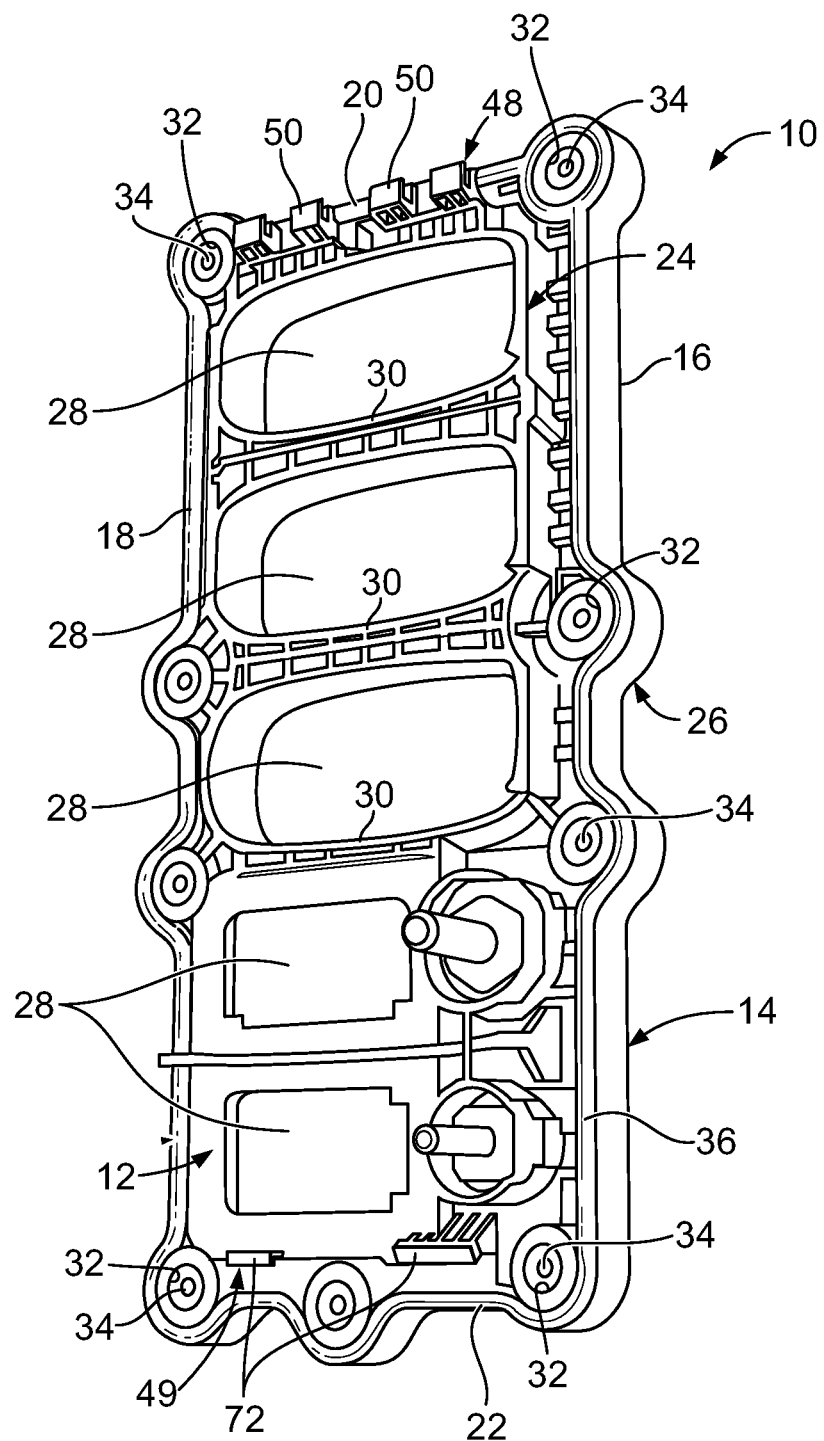
FIG. 1 is a perspective view of an example pass through plate in an assembled state, in accordance with various embodiments.

Embodiments of pass through plates will be described hereinafter in detail with reference to the attached drawings, wherein like reference numerals refer to the like elements. Pass through plates as disclosed herein may, however, be embodied in many different forms and should not be construed as being limited to the embodiments set forth herein; rather, these embodiments are provided so that the disclosure will be thorough and complete, and will fully convey the concept of pass through plates to those skilled in the art.

Pass through plates are generally configured for use in the cabin of a vehicle for accommodating the passage of electrical elements, cables, terminals and the like therethrough from the cabin to an adjacent compartment of the vehicle, e.g., the engine compartment or the like. In an example, the pass through plates as disclosed herein are configured for placement and attachment to a pedal plate or panel disposed in a pedal box of a vehicle passenger compartment. The pass through plate as configured for such use comprises one or more openings therethrough to facilitate passage of the electrical elements between the vehicle compartments and, in an example embodiment, is formed from or has an outer surface comprising an electrically nonconductive material so as to avoid or eliminate the possibility of an electrical short in the event that a conductor in an electrical element disposed through the pass through plate becomes exposed and placed into direct contact with the pass through plate. Pass through plates as disclosed herein are specially engineered and configured to facilitate installation and mounting to a pedal plate in a manner that reduces time, increases efficiency, and enables installation and mounting by a single technician.

Figure 2:
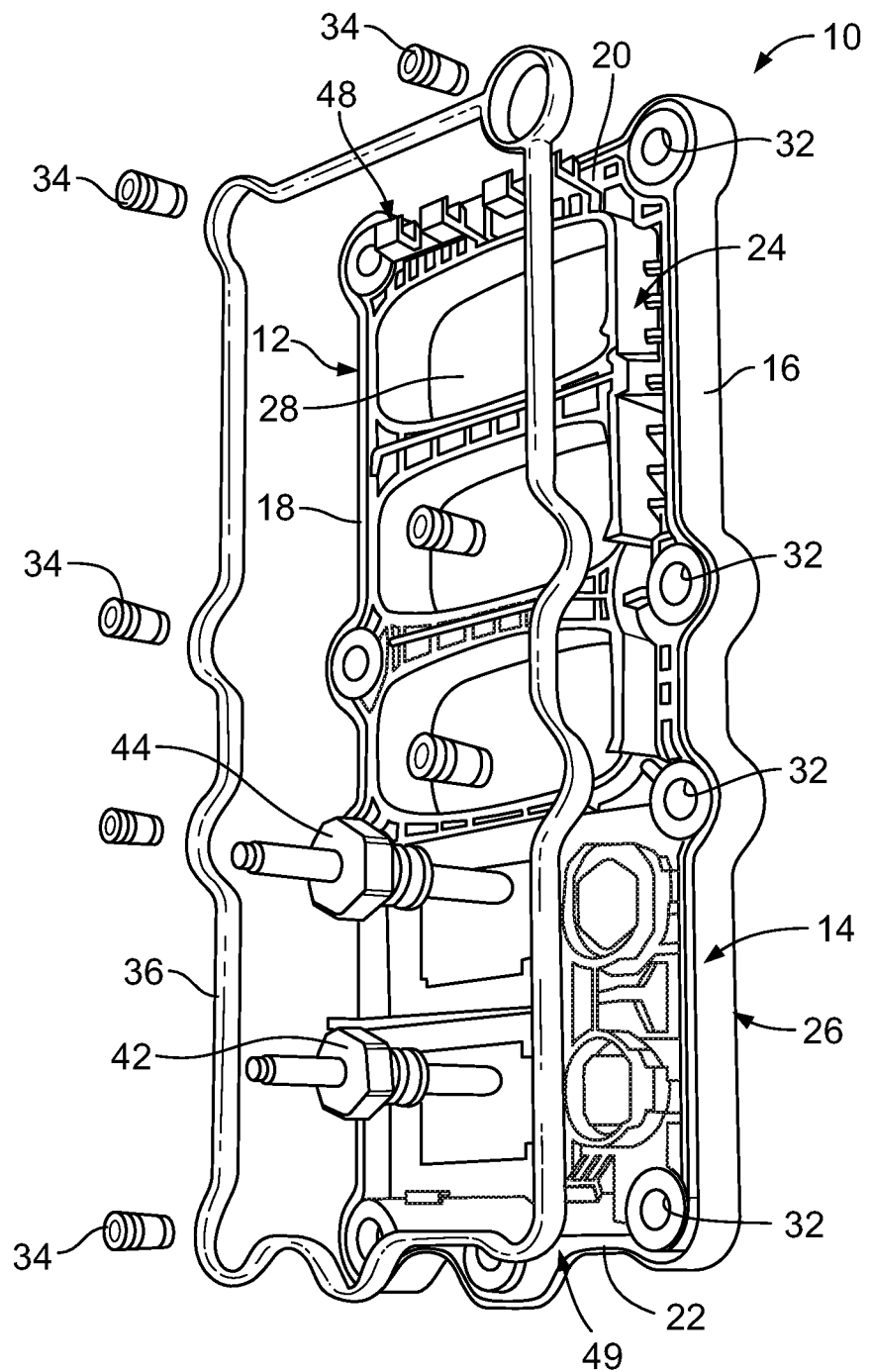
FIG. 2 is a perspective view of the example pass through plate of FIG. 1 in an unassembled state, in accordance with various embodiments.

FIGS. 1 and 2 illustrate an example pass through plate 10 as disclosed herein comprising a body 12 that is sized and shaped to facilitate attachment with a desired object such as an opening within a pedal plate or panel of a vehicle. In an example, the pass through plate body 12 is configured having a rectangular shape and includes an outer section 14 that defines the outside dimension of the pass through plate 10. The body outer section 14 includes opposed long sides 16 and 18 and opposed short sides 20 and 22. In an example, the body 12 is formed from an electrically nonconductive material. Examples of such nonconductive materials include but are not limited to polymeric materials, polyvinyl chloride, plastics and the like. In an example, the body 12 has a generally flat or plate-shaped configuration with opposed surfaces 24 and 26, wherein surface 24 is configured for contact and attachment with a desired object such as a pedal plate of a vehicle, and the opposed surface 26 is an external surface that may reside within a pedal box inside of a passenger compartment or cabin of a vehicle. In an example, the pedal plate separates the vehicle passenger compartment from the vehicle engine compartment.

The pass through plate body 12 comprises a number of openings 28 extending through a thickness of the body 12 as defined between the surfaces 24 and 26. The openings 28 are positioned and configured to accommodate placement and passage of electrical elements, cables, conductors and the like therethrough. The openings 28 are defined by web sections 30 that extend between the body long sides 16 and 18. In an example, the openings 28 may be positioned and configured to accommodate placement of a wiring harness or the like therein to facilitate passage of the wiring harness between a vehicle passenger and engine compartment. In an example, the electrical element of the wiring harness may be routed to an instrumentation portion of the passenger cabin for the purpose of displaying certain operating parameters of the vehicle engine or the like.

While a pass though plate 10 has been illustrated having five openings 28 that are generally rectangular in configuration, it is to be understood that the particular number, shape and/or placement position of such openings 28 in the pass through plate 10 can and will vary depending on the particular end-use application, and all such variations are within the scope of pass through plates as disclosed herein. Additionally, the openings 28 may have an axial thickness within the body 12 that exceeds the thickness of the pass though plate 10 as defined between the opposed surfaces 24 and 26. In an example, one or more of the openings 28 may include a wall surface that extends axially beyond one or both of the pass through plate body surfaces 24 and 26. In an example, one or more of the openings 28 have a wall surface that extends axially a distance beyond a plane of the body surface 24 as taken along the peripheral edge of the body 12 for the purpose of extending a distance equal to or beyond a depth of the pedal plate opening that the pass through plate is attached to. Configured in this manner, such extended wall surface provides an enhanced degree of protection to the electrical elements disposed within the pass through plate from possibly contacting the adjacent pedal plate opening, which may be made from a metallic material.

The body 12 includes a number of mounting or attachment holes 32 (also shown in FIG. 2) disposed along the outer section 14 of the body 12 and that are fitted with inserts 34 configured to be fixedly attached within the attachment holes 32. In an example, the inserts 34 are metallic and are sized and configured to accommodate attachment with fastening elements (not shown) that are used to mount and secure attachment of the pass through plate 10 to the pedal plate or panel. In an example, the fastening elements are threaded fasteners or screws that threadedly engage the inserts 34 for the purpose of mounting the pass through plate 10 to the pedal plate. The body surface 24 includes a recessed channel extending along a peripheral edge of the surface 24 and that is configured to accommodate placement of a seal member 36 therein. The seal member 36 projects outwardly a distance from the surface 24 and is used to provide a seal, which may be a leak-tight seal, between the pass through plate 10 and the pedal plate when the pass through plate is attached thereto by compression of the seal against an adjacent surface of the pedal plate. It is to be understood that the use of the seal member 36 and providing a seal between the pass through plate 10 and the pedal plate is optional and may not be called for in certain end-use applications.

The body 12 may include one or more electrical terminals, conductors, or power studs 42 and 44 that are disposed therethrough and that extend between surfaces 24 and 26 for the purpose of providing electrical or power transfer between the vehicle compartments. The electrical conductors, terminals, or power studs may be sized similarly or differently depending on the particular end-use application, and may be connected with the pass through plate by use of receptacle openings in the pass through plate body 12 configured to accommodate attachment therewith.

Figure 3:
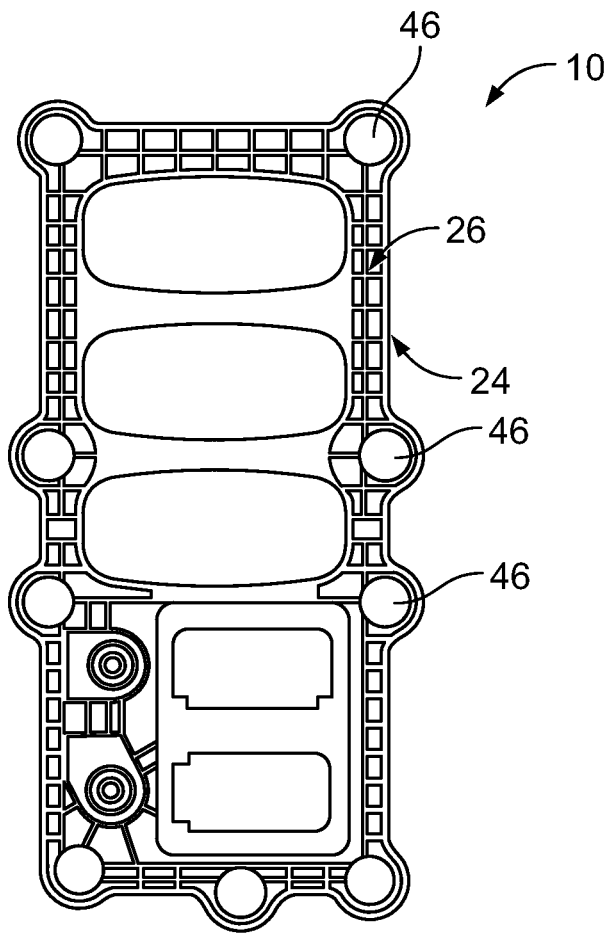
FIG. 3 is a perspective view of the example pass though plate of FIG. 1 showing a surface of the plate opposite a surface that engages a vehicle pedal plate or panel, in accordance with various embodiments.

FIG. 3 illustrates the pass through plate 10 as disclosed above specifically showing the surface 26 that is opposite the surface 24 and that extends into a passenger compartment when used in a vehicle application. The surface 26 includes plugs 46 that are disposed in the attachment holes (32 as shown in FIGS. 1 and 2) for sealing off the holes.

A feature of example pass through plates 10 as disclosed herein and as illustrated in FIGS. 1 and 2 is the presence of upper retaining features 48 and lower retaining features 49 that are respectively positioned along the body upper short side 20 and lower short side 22 and that are each configured to extend outwardly a distance from the body surface 24. The upper retaining features 48 are provided in the form of a pair of upper retaining elements 50 (as shown in FIG. 1) that are spaced a distance laterally apart from one another between the attachment holes 32 positioned at opposed corners of the upper short side.

Figure 4:
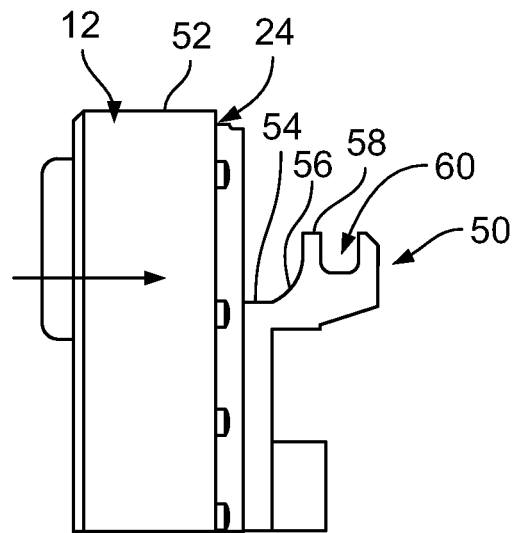
FIG. 4 is a perspective side view of a section of the pass through plate of FIG. 1 showing an example upper retaining feature, in accordance with various embodiments.

With reference to FIG. 4, each upper retaining element 50 is positioned a distance below a top edge 52 of the body 12 and includes a first section 54 that projects outwardly perpendicular from the body surface 24 a distance to second section 56 that moves upwardly away from the first section 54 in a curved manner to an end 58. In an example, the second section 56 adjacent the end 58 is oriented approximately parallel to the body surface 24 and perpendicular to the first section 54. In an example, the distance between the upper retaining element second section 56 and the body surface 24 is greater than a depth of a pedal plate opening as defined between opposed pedal plate surfaces. In an example, the upper retaining element 50 is configured to be disposed into the pedal plate opening and engage a backside surface of the pedal plate adjacent an upper portion of the pedal plate opening to retain placement of the pass through plate 10 within the upper portion of the pedal plate opening during installation of the pass through plate (as discussed in greater detail below). The example upper retaining element 50 may optionally include a C-shaped channel section 60 extending outwardly from the end 58, which may be used to accommodate attachment with a cover or the like (not shown) in the event that it is desired that a cover be placed over the pedal plate opening once the pass through plate has been installed.

Figure 5:
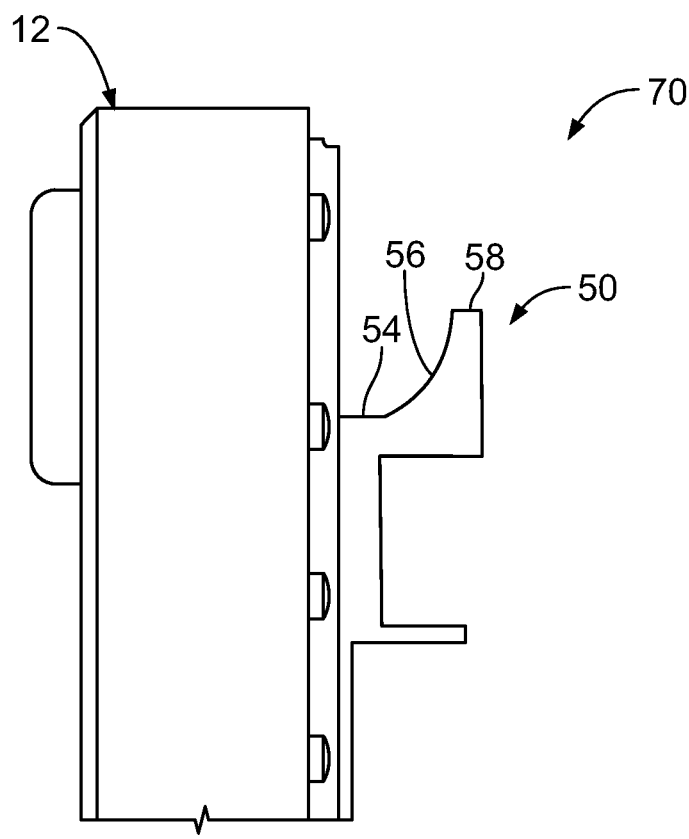
FIG. 5 is a perspective side view of a section of an example pass through plate showing another example retaining feature, in accordance with various embodiments.

FIG. 5 illustrates a portion 70 of an example pass through plate body 12 as disclosed herein comprising an upper retaining element 50 that is configured in the same manner described above with reference to the upper retaining element 50 illustrated in FIG. 4, except that the upper retaining element 50 of FIG. 5 only includes the first section 54, second section 56, and end 58, and does not include the optional C-shaped channel section. A feature of the upper retaining element 50 as disclosed herein (as described in greater detail below) is that it is configured to form a hinge point with the upper portion of the opening through the pedal plate during installation to provide alignment of the pass through plate within the opening and facilitate a downward rotation of the remaining portion of the pass through plate towards a remaining portion of the pedal plate opening.

Figure 6:
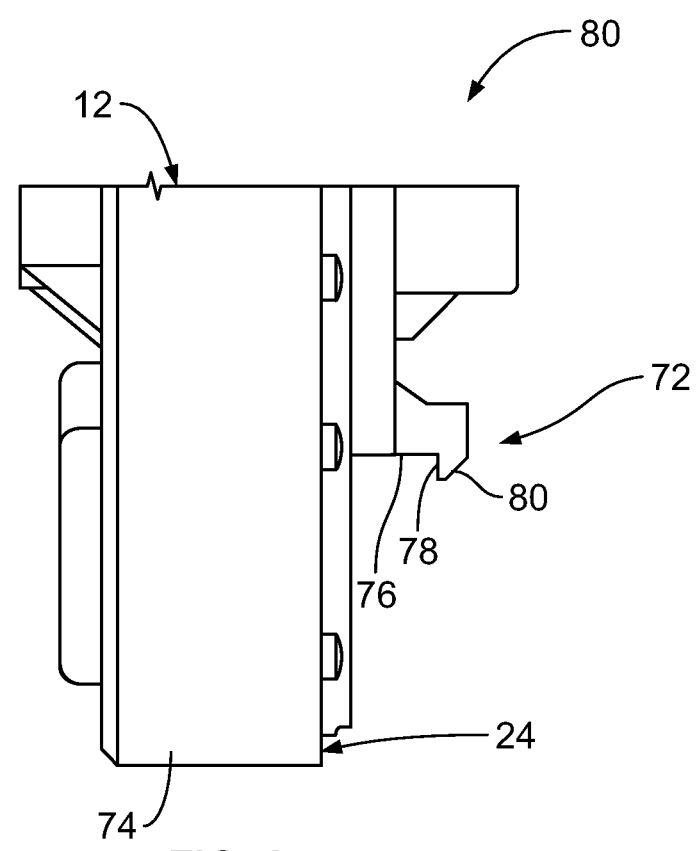
FIG. 6 is a perspective side view of a section of the pass through plate of FIG. 1 showing an example lower retaining feature, in accordance with various embodiments.

With reference to FIGS. 1 and 2, the lower retaining features 49 are provided in the form of a pair of lower retaining elements 72 that are spaced a distance laterally apart from one another between inserts 34 disposed within the attachment holes 32 that are positioned at opposed corners of the pass through plate lower short side 22. FIG. 6 illustrates a portion 85 of an example pass through plate body 12 as disclosed herein comprising the lower retaining element 72 that is positioned a distance above a bottom edge 74 of the body 12 and that includes a first section 76 that projects outwardly perpendicular from the body surface 24 a distance to second section 78 that departs downwardly in a perpendicular manner a distance from the first section 76 and forms an end 80. In an example, the end 80 includes an upwardly angled surface moving outwardly away from the body surface 24. In an example, the distance between the lower retaining element second section 78 and the body surface 24 is slightly greater than a depth of a pedal plate opening as defined between opposed pedal plate surfaces. In an example, the lower retaining element 72 is configured to be disposed into the lower portion of the pedal plate opening and engage a backside surface of the pedal plate to retain placement of the pass through plate within the lower portion the opening during installation of the pass through plate (as described in greater detail below. In an example, the angled surface of the lower retaining element end 80 is useful to facilitate passage of the lower retaining element end 80 across an edge of the lower portion of the pedal plate opening during pass through plate installation, as such angled surface operates to move or deflect the pass through plate upwardly for purposes of the lower retaining element 72 passing into and through the pedal plate opening lower portion.

It is to be understood that upper and lower retaining elements 50 and 72 as used with pass through plates 10 as disclosed herein may be configured differently than as specifically disclosed and illustrated, while performing the same function of retaining the pass through plate 10 within the pedal plate opening during installation of the pass through plate with the pedal plate opening, and that all such configurations capable of performing this function are intended to be within the scope of this description. While the upper and lower retaining elements 50 and 72 have been disclosed as being present as a pair, it is to be understood that the upper and lower retaining elements 50 and 72 as disclosed herein may be present and configured in the form of a single upper retaining element 50 and/or lower retaining element 72 or may be present in the form or more than two upper retaining elements 50 and/or lower retaining elements 72 depending on the particular configuration and/or end-use application of pass through plates as disclosed herein. A feature of such upper and lower retaining elements 50 and 72 is that they are integral with the pass through plate 10 and form a one-piece construction therewith, and are not provided in the form of separate elements that are combined with the pass through plate 10 before or during installation with the pedal plate opening.

Figure 7:
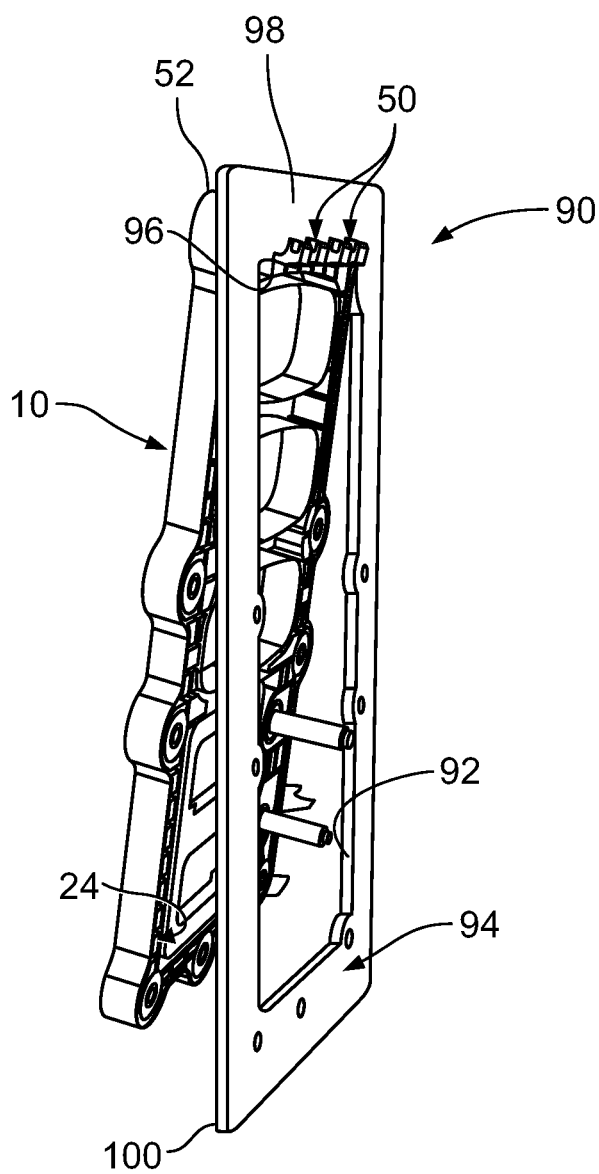
FIG. 7 is a perspective view of the example pass through plate of FIG. 1 during an initial installation step of the pass through plate with the vehicle pedal plate or panel, in accordance with various embodiments.

FIG. 7 illustrates an initial state of installation 90 of an example pass through plate 10 as disclosed herein with an opening 92 through a pedal plate 94. In such initial state of installation 90, the pass through plate 10 is aligned with the pedal plate opening 92 such that the top edge 52 of the body 12 is adjacent an upper portion 96 of the pedal plate opening 92. The pass through plate 10 is oriented in a forward-tilted position such that the pass through plate upper retaining elements 50 extend through the upper portion 96 of the pedal plate opening 92 and engage a backside surface 98 of the pedal plate 94 adjacent the opening upper portion 96. In this state, a portion of the pass through plate body surface 24 adjacent the body upper short side top edge 52 is in contact with a frontside surface 100 of the pedal plate 94 adjacent the opening upper portion 96. The curved configuration of each upper retaining element second section (56 as shown in FIGS. 4 and 5) operates to ease this process while the ends (58 as shown in FIGS. 4 and 5) of each upper retaining element 50 operate to retain engagement of the pass through plate 10 within the pedal plate opening upper portion 96 while the pass through plate 10 is upwardly supported.

Figure 8A:
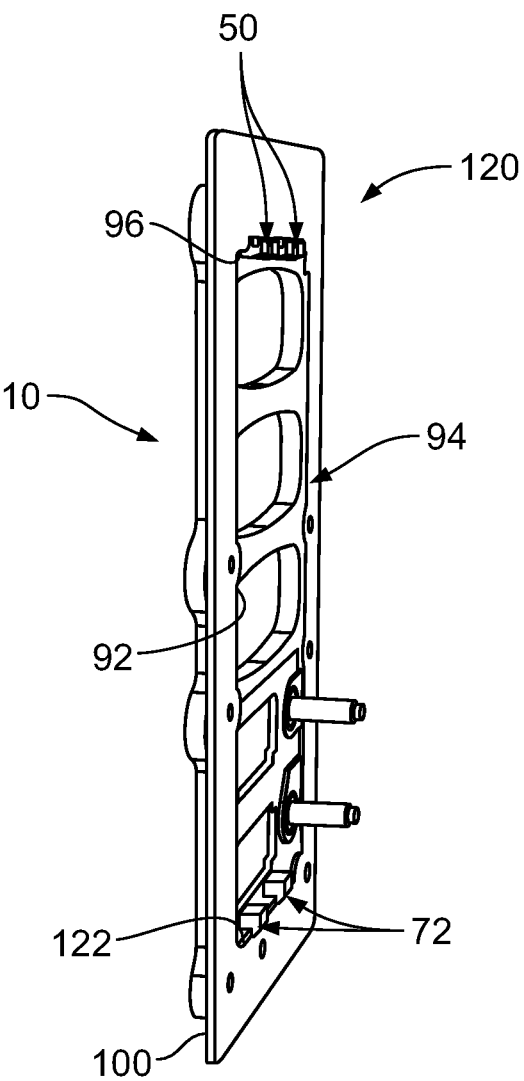
FIG. 8A is a perspective view of the example pass through plate during an installation step subsequent to the one illustrated in FIG. 7, after a lower portion of the pass though plate has been moved into engagement with the pedal plate or panel, in accordance with various embodiments.
Figure 8B:
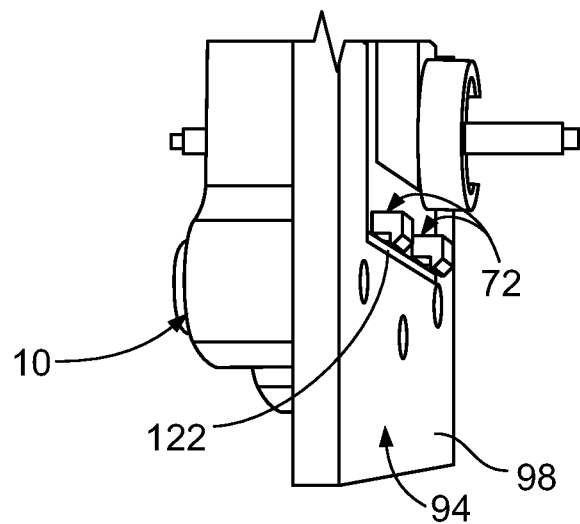
FIG. 8B is a perspective side view of a section of the pass through plate of FIG. 8A showing a placement position of example lower retaining features relative to the pedal plate or panel opening, in accordance with various embodiments.

FIG. 8A illustrates a subsequent state of installation 120 of the pass through plate 10 relative to the initial state of installation 90 described above and illustrated in FIG. 7. This state of installation 120 is achieved by maintaining upward support on the pass through plate 10, thereby maintaining engagement of the upper retaining elements 50 with the pedal plate opening upper portion 96 while moving or pivoting a lower portion of the pass through plate towards a lower portion 122 of the pedal plate opening 92. With maintained upward support on the pass through plate 10 and such pivoting movement provided by the upper retaining elements 50, the lower retaining elements 72 pass through the lower portion 122 of the pedal plate opening 92 and the body surface 24 adjacent the lower portion of the pass through plate comes into contact with the pedal plate frontside surface 100. As best illustrated in FIG. 8B, in this state of installation 120, the pass through plate 10 is still being upwardly supported such that the lower retaining elements 72 are disposed above the pedal plate opening lower portion 122, and each lower retaining element second section (78 as shown in FIG. 6) is not yet in contact against the pedal plate backside surface 98.

Figure 9:
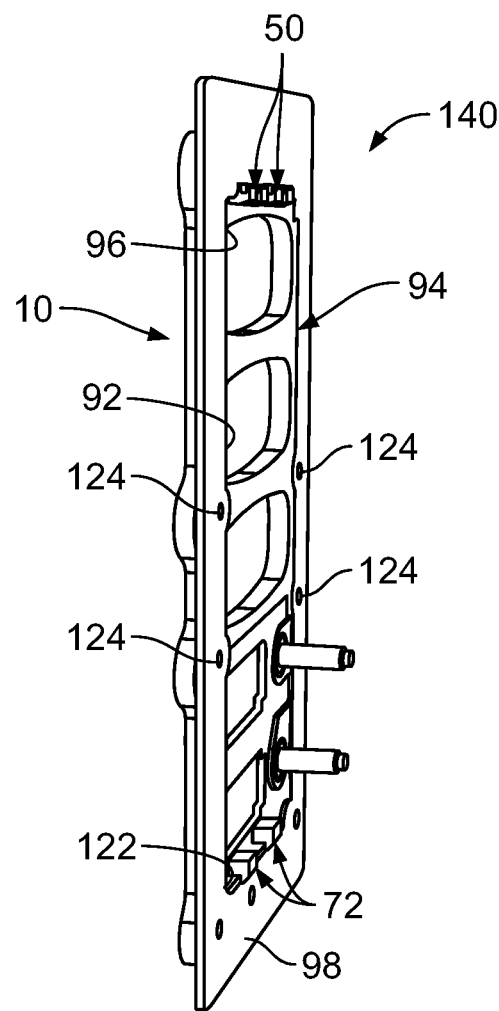
FIG. 9 is a perspective view of the example pass through plate during an installation step subsequent to that illustrated in FIG. 8A, after the pass through plate has been lowered into position relative to the pedal plate or panel opening for fastener attachment, in accordance with various embodiments.

FIG. 9 illustrates a subsequent state of installation 140 of the pass through plate 10 relative to the state of installation 120 described above and illustrated in FIG. 8A. This state of installation 140 is achieved by removing upward support from the pass through plate 10 while the position of the pass through plate 10 adjacent to the pedal plate opening 92 is retained. Upon removing such upward support the pass through plate 10 is allowed to move/slide downwardly within the pedal plate opening 92 a distance such that the second section (78 as shown in FIG. 6) of each lower retaining element 72 engages the pedal plate backside surface 98, causing the pass through plate 10 to be in a resting position in the pedal plate opening 92. In this state, both the upper retaining element second sections (56 as shown in FIGS. 4 and 5) and the lower retaining element second sections (78 as shown in FIG. 6) are engaged with the backside surface 98 of the pedal plate 94 adjacent respective pedal plate opening upper and lower portions 96 and 122. Also, in this resting position, the pass through plate attachment holes and inserts (32 and 34, respectively as shown in FIG. 1) are oriented in alignment with attachment openings or holes 124 in the pedal plate to facilitate attachment of the two through the use of fastening elements (not shown) such as threaded fasteners and the like. In an example, the upper retaining elements 50 and lower retaining elements 72 (specifically the first sections 54 and 76 of the respective upper and lower retaining elements 50 and 72) are positioned apart from one another a distance that is less than the distance between the pedal plate opening upper portion 96 and lower portion 122 to enable such pass through plate movement within the pedal plate opening 92. Additionally, the upper retaining elements 50 and lower retaining elements 72 (specifically the second sections 56 and 78 of the respective upper and lower retaining elements 50 and 72) are positioned apart from one another a distance that is greater than the distance between the pedal plate opening upper portion 96 and lower portion 122 to the pass through plate to be retained within the pedal plate opening 92 in a position to facilitate attachment by use of fastening members.

A feature of pass through plates 10 as disclosed herein comprising the upper and lower retaining elements 50 and 72 is that the weight of the pass through plate 10, which oftentimes during installation includes the electrical elements in the form of a wiring harness and stresses imposed thereon, operates to cause the pass through plate 10 to move downwardly by gravity once upward support is removed to ensure the secure engagement of the lower retaining elements 72 with the lower portion 122 of the pedal plate opening 92. Thus, the lower retaining elements 72 are configured to permit the weight of the pass through plate 10 to provide a secure installation engagement with the pedal plate opening 92. Another feature is that the upper retaining elements 50 are configured to engage and register with the pedal plate opening upper portion 96 to align the pass through plate 10 relative to the pedal plate opening 92 in a manner that is not technician dependent during subsequent stages of pass through plate 10 installation.

A feature of pass through plates 10 as disclosed herein is the positioning and configuration of the upper and lower retaining elements 50 and 72 extending from the body surface 24 to ensure engagement, registration, installation and retention of the pass through plate 10 within the pedal plate opening 92 in the manner disclosed and illustrated, which manner does away with the awkwardness and time consuming process associated with attaching conventional pass through plates. A further feature is that the weight of the pass through plate 10 and wiring harness disposed therethrough operates to ensure secure engagement of the lower retaining elements 72 with the pedal plate opening 92 for purposes of then fixedly attaching the pass through plate 10 to the pedal plate. Further, the upper and lower retaining elements 50 and 72 provided as an integral part of the pass through plate body 12 eliminates the need to use separate retaining elements that may be difficult to attach and/or maintain in a position that ensures proper alignment of the pass through plate 10 relative to the pedal plate 94 needed to facilitate fixed attachment.

The foregoing description and accompanying figures illustrate the principles, preferred embodiments and modes of operation of pass through plates as disclosed herein. However, such pass through plates should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the pass through plate as defined by the following claims.

For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "in an example," "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A plate for attachment with an external object having an opening for passing one or more electrical elements therethrough, the plate comprising:
    a body comprising opposed first and second surfaces;
    one or more openings disposed through the body and extending between opposed peripheral edges of the body for accommodating the passage of one or more electrical elements therethrough;
    a first retaining element extending from the first surface and positioned adjacent a body top peripheral edge, wherein the first retaining element has a first section that projects outwardly in a direction perpendicular to the first surface and has a second section that projects upwardly away from the first section to a terminal end of the first retaining element located above the second section; and
    a second retaining element extending from the first surface and positioned adjacent a body bottom peripheral edge, wherein the second retaining element has a first section that projects outwardly in a direction perpendicular to the first surface and has a second section that projects downwardly away from the second retaining element first section to a terminal end of the second retaining element located below the second retaining element second section;
    wherein the first retaining element first section and the second retaining element terminal end are positioned apart from one another without being deformed a distance that is less than a distance between opposed top and bottom sections of the external object opening, wherein the first retaining element second section extends a length that is different than the second retaining element second section, and wherein the first retaining element second section has a surface extending between the first retaining element first section and the first retaining element terminal end that is shaped differently than a surface of the second retaining element second section extending between the second retaining element first section and the second retaining element terminal end.

2. The plate as recited in claim 1, wherein the first retaining element upwardly-facing terminal end is positioned a distance from the second retaining element first section that is greater than the distance as measured between the top portion and the bottom portion of the external object opening.

3. The plate as recited in claim 1, wherein the first retaining element second section extends a length as measured from the first retaining element first section that is greater than a length of the second retaining element second section as measured from the second retaining element first section.

4. The plate as recited in claim 1, wherein the second retaining element has an angled surface portion moving away from the second retaining element downwardly-facing terminal end, wherein the angled surface portion extends outwardly away from the plate first surface.

5. The plate as recited in claim 1, wherein the first retaining element second section surface has an angle of departure as measured relative to the first retaining element first section that is greater than 90 degrees.

6. The plate as recited in claim 5, wherein the first retaining element second section surface is curved to engage a backside surface of the external object adjacent the external object.

7. The plate as recited in claim 1, wherein the first and second retaining elements are integral with the body and form a one-piece construction.

8. The plate as recited in claim 1, further comprising a number of holes positioned along a peripheral edge of the body extending from the first surface to the second surface for attaching the body to the external object, wherein the number of holes align with attachment holes in the external object adjacent the external object opening when the first and second retaining elements are disposed in the external object opening.

9. The plate as recited in claim 1, wherein the body includes more than one of the first retaining elements and more than one of the second retaining elements.

10. A pass through plate for connecting with an opening though an external object, the pass through plate comprising:
a body having a thickness along a peripheral edge defined between opposed first and second surfaces, the body having one or more open cavities disposed therethrough and positioned between opposed peripheral edges for accommodating passage of one or more electrical elements therethrough;
a first retaining element positioned adjacent a top portion of the body and comprising a first section that projects outwardly from the first surface, wherein the first retaining element comprises a second section that extends from the first section in an upward direction to a terminal end; and
a second retaining element positioned adjacent a bottom portion of the body and comprising a first section that projects outwardly from the first surface, wherein the second retaining element comprises a second section that extends from the second retaining element first section in a downward direction to a terminal end, wherein the first retaining element second section comprises a upwardly facing surface having an angle of departure as measured from the first retaining element first section of greater than 90 degrees, wherein the first retaining element second section is configured differently than the second retaining element second section, and wherein the first retaining element first section is spaced apart from the second retaining element distal end a distance that is less that a distance between opposed top and bottom sections of the external object opening.

11. The plate as recited in claim 10, wherein the body is rectangular in shape and the top portion of the body and bottom portion of the body are located along opposed short sides of the body.

12. The plate as recited in claim 10, wherein the body is rectangular in shape and comprises more than one of the open cavities, wherein the open cavities are surrounded within the body and extend between opposed long sides of the body and are separated by cross elements that are integral with the body.

13. The plate as recited in claim 10, comprising a number of holes extending along the peripheral edge of the body for attaching the plate to the external object, wherein the number of holes is configured to accommodate placement of respective fastening elements therein for attaching the plate to the external object.

14. The plate as recited in claim 10, wherein the first retaining element second section extends upwardly in a gradual manner moving from the first retaining element first section to the first retaining element terminal end.

15. The plate as recited in claim 14, wherein the first retaining element second section comprises a curved upwardly facing surface between the first retaining element first section and the first retaining element terminal end.

16. The plate as recited in claim 15, wherein the first retaining element second section has a length as measured from the first retaining element first section that is different than a length of the second retaining element second section as measured from the second retaining element first section.

17. An assembly comprising the plate of claim 10 that is connected to the external object opening, wherein in a first connection state the plate is positioned in an upward location relative to the external object opening and the first retaining element first section is in contact with the top section of the external object opening and the first retaining element section is positioned against a backside surface of the external object adjacent the top section of the external object opening, and wherein in the first connection state the plate second retaining element first section does not contact the bottom section of the external object opening and both the second retaining element second section and the second retaining element terminal do not contact either of the bottom section of the external object opening or a backside surface of the external object adjacent the bottom section of the external object opening, wherein in the first connection state the plate is movable upwardly and downwardly within the external object opening, wherein in a second connection state the plate is positioned in a downward location relative to the external object opening and the first retaining element first section is not in contact with the top section of the external object opening and the first retaining element second section is positioned against the backside surface of the external object adjacent the top section of the external object opening, and wherein the in second connection state the plate second retaining element first section is in contact with the bottom section of the external object opening and the second retaining element second section is positioned against the backside surface of the external object adjacent the bottom section of the external object opening.

18. A An assembly for accommodating the passage of electrical cable therethrough comprising:
- an external object comprising an opening for accommodating passage of electrical cable therethrough, the opening comprising a top section and an opposed bottom section, the external object comprising a frontside surface and an opposed backside surface adjacent the opening;
- a plate comprising:
  - a body having opposed first and second surfaces, and having a top portion at one end of the body and a bottom portion at another end of the body opposite the top portion;
  - an opening disposed through the first and second surfaces and surrounded within the body, the plate opening configured to accommodate passage of electrical cable through the plate;
  - a first retaining element extending outwardly from the first surface adjacent the top portion and having a section that projects upwardly in a gradual manner to a terminal end of the first retaining element; and
  - a second retaining element extending outwardly from the first surface adjacent the bottom portion and having a section that projects downwardly parallel with the first surface to a terminal end of the second retaining element, wherein the first retaining element is configured differently from the second retaining element;
- wherein in a first connected state the plate first surface is connected with the external opening frontside surface and the plate is in an uppermost position within the external object opening, the first retaining element is in contact with the top section and the first retaining element section and terminal end are adjacent the backside surface, the second retaining element is not in contact with the bottom section and the second retaining element section and terminal end are disposed above the bottom section; and
- wherein in a second connected state the plate first surface is connected with the external opening frontside surface and the plate is in a bottommost position within the external object opening, the first retaining element is not in contact with the top section and the first retaining element section and distal end is adjacent the backside surface, the second retaining element is in contact with the bottom section and the second retaining element section and terminal end is disposed below the bottom section adjacent the backside surface, and wherein the plate is movable up and down in the external object opening between the first and second states.

19. The plate as recited in claim 18, wherein the first retaining element section is curved, and the second retaining element section is flat.

20. The plate as recited in claim 18, wherein the first retaining element is comprises an upwardly facing surface that is positioned apart from the second retaining element terminal end a distance that is less than a distance between the external object opening top section and bottom section.

\* \* \* \* \*